United States Patent Office 3,113,723
Patented Dec. 10, 1963

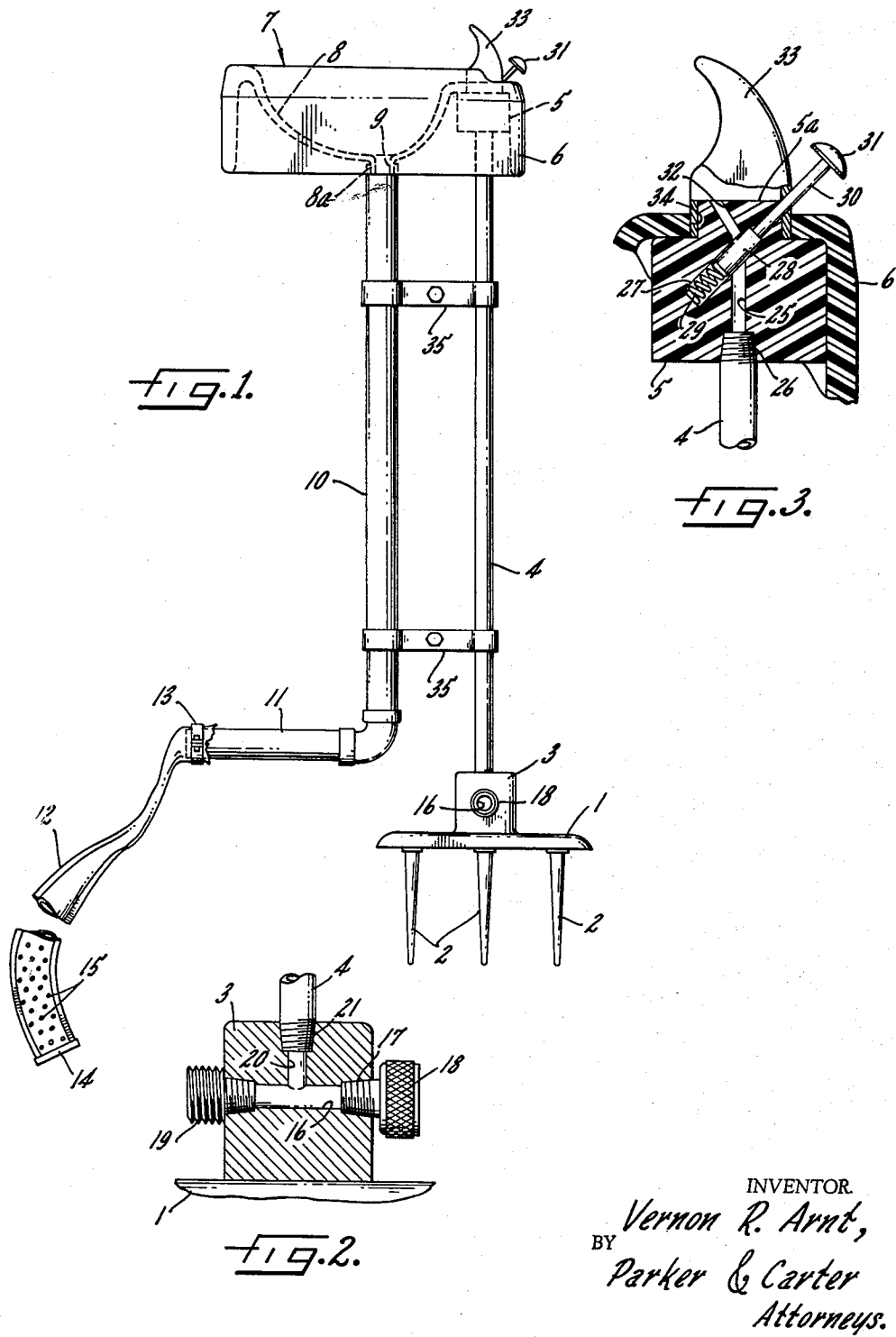

3,113,723
LAWN FOUNTAIN
Vernon R. Arnt, 431 S. Princeton Ave., Villa Park, Ill.
Filed Nov. 1, 1962, Ser. No. 234,714
5 Claims. (Cl. 239—29)

This invention relates to drinking fountains and has particular relation to the provision of a drinking fountain for installation in outdoor environments.

One purpose of the invention is to provide a drinking fountain which may be easily and conveniently installed.

Another purpose is to provide a drinking fountain which may be easily and conveniently installed, in turn, at a number of outdoor locations.

Another purpose is to provide a portable drinking fountain.

Another purpose is to provide a drinking fountain assembly having means for preventing the creation of moist areas adjacent the base of the fountain.

Another purpose is to provide a fountain which may be easily installed in a lawn, adjacent patios, barbecues, and the like and in parks and the like.

Another purpose is to provide a lawn fountain of minimum weight and of adequate strength and rigidity.

Another purpose is to provide a lawn fountain which may be employed in conjunction with an ordinary garden hose and which may include provisions for attachment of additional garden hose thereto.

Another purpose is to provide a lawn fountain which may be employed with an ordinary garden hose without interruption of normal garden hose functions.

Another purpose is to provide a lawn fountain of maximum simplicity in construction and arrangement of parts.

Other purposes will appear from time to time in the course of the specification and claims.

I illustrate the invention more or less diagrammatically in the accompanying drawings, wherein:

FIG. 1 is a side view;

FIG. 2 is a detailed view illustrating one portion of the invention on an enlarged scale; and FIG. 3 is a detailed view illustrating another portion of the invention on an enlarged scale.

Like parts are indicated by like numerals throughout the specification and drawings.

Referring now to the drawings, and particularly to FIG. 1, the numeral 1 indicates a base plate. Downwardly depending from the base plate 1 is a plurality of spikes or ground-penetrating members 2. The base 1 includes a central upper block 3 from which the water conduit pipe 4 extends upwardly. The upper end of pipe 4 communicates with a valve block 5 within the outer skirt 6 of a bowl member generally indicated by the numeral 7. The skirt 6 surrounds a bowl portion 8 having a central drain outlet 9.

A drain pipe 10 depends downwardly from the drain outlet 9 and has a laterally disposed or angular end portion 11. Secured to the outlet of end portion 11 is a water-dispersing element 12. The element 12 is clamped to the end of drain pipe portion 11 by any suitable clamping means, such as the member 13. Member 12 comprises a hollow, flexible rectilinear member having a closed end 14 and a plurality of perforations 15 adjacent thereto.

The block 3 has a water passage 16 formed therein and penetrating two walls thereof. Into the threaded socket 17 is fitted a female fixture 18. Into the threaded opposite end of passage 16 is fitted a male fixture 19. A branch passage 20, of substantially reduced diameter, communicates with the passage 16 and the threaded well 21 with which pipe 4 communicates.

The valve block 5 has a water passage 25 communicating with the pipe 4, as at 26, and with a valve chamber 27 in block 5. Slidable in chamber 27 is a valve member 28 urged by spring 29 into a position in which it closes passage 25. The valve piston 28 is secured to an operating rod 30 which extends outwardly of block 5 and above bowl 7. The outer end of rod 30 carries an operating handle member 31. A water outlet passage 32 is formed in block 5 and communicates with chamber 27 across from and in substantial alignment with the communication of passage 25 therewith. The passage 32 penetrates an upper projection 5a on block 5 in an angular path to provide for discharge of drinking water at an angle beneath a protecting hood 33. The base of hood 33 surrounds and seats upon the projection 5a and the projection 5a, with its surrounding portion of hood 33, fits snugly within an aperture 34 formed in an upper horizontal or flange surface of bowl 7.

Supporting strap members 35 are secured to and extend between the water pipe 4 and drain pipe 10 beneath the bowl 7.

Preferably the bowl 7, valve block 5 and drain pipe 10 may be formed of plastic, the bowl segment 8 having a downwardly depending segment 8a surrounding outlet 9 and communicating with the upper portion of drain pipe 10, which may be adhesively or otherwise secured to portion 8a. The dispensing and dispersing sleeve-like member 12 may be conveniently rolled up and taped or otherwise secured to the extension 11 when the sleeve is not in use or when the fountain of the invention is to be moved. In this regard drain portion 11 is slightly above base 1, whereby the portion 11 and rolled-up sleeve 12 will be out of contact with the ground when not in use.

In use, the operator selects a location and then places the fountain, with pipe 4 secured in well 21 and drain pipe 10 secured to bowl 8, in upright position at that location. The stabilizing spikes are then pressed into the ground surface, plate 1 being of sufficient extension to receive the feet and weight of the operator, if desired, for this purpose. A water supply conduit, such as a garden hose, is then fitted into fitting 18. A second conduit or hose is fitted onto fitting 19 or, alternatively, fitting 19 is capped off.

The sleeve 12 is secured to end 11 of drain pipe 10 and is rolled out to an area toward which drain water from bowl 8 is to be directed. The fountain of the invention is then ready for use, pressure upon handle or button 31 being effective to deliver drinking water through pipe 4 and valve block 5.

Whereas I have shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

For example, a web formed of four joined conical members may be substituted for the prongs 2 without departing from the nature and scope of the invention. Similarly, the inlet 18 and the outlet 19 may be arranged one above the other with a passage therebetween in the base 3 and a branch passage therefrom to the pipe 4. Again, the drain 10 could communicate with a drain passage formed in a base 3, the outlet end of which could communicate with a fitting 11 to which the member 12 would be secured, all without departing from the nature and scope of the invention. In the latter event, the strap elements 35 might be dispensed with. If the base 3 be expanded to accommodate the changes envisaged, the base 1 would be correspondingly enlarged to provide for foot-engaging surfaces on opposite sides of the base element 3. With these and other possible modifications and changes in mind, I desired that the scope of the invention, as above indicated, be limited only by the scope of the hereinafter appended claims.

I claim:

1. A portable fountain comprising a base, ground-penetrating members depending from said base, a fluid inlet on said base, a fluid conduit upstanding from said base, a valve block secured to an upper portion of said conduit, a manually operable valve in said block, a bowl, an outlet in said valve block disposed to deliver fluid above said bowl, a drain pipe secured to a lower portion of said bowl and communicating therewith, said drain pipe paralleling said fluid conduit, at least one strap member bridging said conduit and drain pipe and secured thereto, and a water-dispersing sleeve secured to the outlet end of said drain pipe and extending therefrom to a point removed from said base, said sleeve comprising an elongated flexible member having an open end secured to said drain pipe outlet and having a closed opposite end and a plurality of apertures adjacent said closed opposite end, said sleeve having a capability of being rolled upon itself and supported in rolled position on said drain pipe, said base having portions extending outwardly in at least two directions from said conduit whereby foot-engaging areas are provided on said base, said ground-penetrating members depending in spaced relationship, one from the other, from said base and being formed and adapted for ground penetration of substantially the entirety of said ground-penetrating members.

2. A portable fountain comprising a base, a water delivery pipe upstanding from said base, a bowl having a skirt enclosing an upper portion of said pipe, a valve block secured to said bowl, said pipe communicating with said valve block, a fluid passage in said block, a valve member positioned to open and close said last-named fluid passage and having an operating portion extending from said block, said passage having an angularly disposed outlet portion positioned to deliver water above said bowl, a hood element upstanding from said bowl and overlying said valve block outlet, a drain pipe secured to a lower portion of said bowl and paralleling said water delivery pipe, at least one member securing said drain pipe to said water delivery pipe, said drain pipe having an angularly disposed outlet end portion, a water-dispersing flexible sleeve secured to said outlet end portion for receipt of drain water therefrom, said flexible sleeve having a closed outer end and a plurality of apertures in a side wall thereof adjacent said outer end.

3. A portable fountain comprising a metallic base, a metallic water delivery pipe upstanding from said base, a plastic bowl having a skirt surrounding an upper portion of said delivery pipe, a plastic valve block secured to the upper portion of said delivery pipe within said skirt, said valve block having a fluid passage communicating with said delivery pipe and having an angularly disposed outlet portion positioned to direct water above said bowl, a plastic drain pipe secured to said bowl and downwardly depending therefrom in parallel relationship with said delivery pipe, rigid strap members securing said delivery pipe to said drain pipe, and a flexible water-dispersing sleeve secured to the outlet end of said drain pipe and extendible therefrom, said dispersing sleeve having a closed outer end and a plurality of apertures adjacent thereto.

4. The structure of claim 3 wherein said drain pipe outlet end portion is angularly disposed from the major portion of said drain pipe and lies in a plane above that occupied by said base.

5. The structure of claim 4 wherein said flexible sleeve is of an elongated strip configuration capable of being rolled up and supported on said outlet end portion above said base.

References Cited in the file of this patent

UNITED STATES PATENTS

| | | |
|---|---|---|
| 1,156,190 | Sweet | Oct. 12, 1915 |
| 1,232,543 | Helmkamp | July 10, 1917 |
| 1,329,601 | Hinsdale | Feb. 3, 1920 |
| 1,366,055 | Bowlzer | Jan. 18, 1921 |
| 1,632,842 | Liening | June 21, 1927 |
| 1,731,555 | Williams | Oct. 15, 1929 |
| 1,799,079 | Bemis | Mar. 31, 1931 |
| 2,814,529 | Arnt | Nov. 26, 1957 |
| 2,899,137 | Martin | Aug. 11, 1959 |
| 3,067,950 | Goldman | Dec. 11, 1962 |